(12) United States Patent
Landström et al.

(10) Patent No.: US 8,854,999 B2
(45) Date of Patent: Oct. 7, 2014

(54) METHOD AND ARRANGEMENT IN A WIRELESS COMMUNICATION SYSTEM

(75) Inventors: Sara Landström, Luleå (SE); Stefan Wänstedt, Luleå (SE); Mårten Ericson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 158 days.

(21) Appl. No.: 13/388,420

(22) PCT Filed: Aug. 31, 2009

(86) PCT No.: PCT/SE2009/050982
§ 371 (c)(1),
(2), (4) Date: Feb. 1, 2012

(87) PCT Pub. No.: WO2011/025427
PCT Pub. Date: Mar. 3, 2011

(65) Prior Publication Data
US 2012/0127891 A1    May 24, 2012

(51) Int. Cl.
| H04W 74/04 | (2009.01) |
| H04L 12/26 | (2006.01) |
| H04W 72/04 | (2009.01) |
| H04L 12/835 | (2013.01) |
| H04W 72/12 | (2009.01) |

(52) U.S. Cl.
CPC ........... *H04W 72/1284* (2013.01); *H04L 47/30* (2013.01)
USPC ...................................................... 370/252

(58) Field of Classification Search
CPC .................. H04W 72/1284; H04W 28/0278; H04W 72/1221; H04W 72/12; H04W 72/1205; H04W 72/1263; H04W 72/1268; H04W 28/02; H04L 47/30
USPC ......... 370/252, 229, 234, 236, 241, 329, 431, 370/437; 455/450, 451
See application file for complete search history.

(56) References Cited

U.S. PATENT DOCUMENTS 8,290,500 B2 * 10/2012 Pettersson et al. ............ 455/450
2008/0008203 A1    1/2008 Frankkila et al.
(Continued)

FOREIGN PATENT DOCUMENTS

EP       1 139 605 A1    10/2001
WO    WO 2008156402 A1 * 12/2008 ............ H04W 72/12

OTHER PUBLICATIONS

International Search Report, PCT/SE2009/050982, May 17, 2010.
(Continued)

*Primary Examiner* — Mark Rinehart
*Assistant Examiner* — Kenneth P Hunt
(74) *Attorney, Agent, or Firm* — Myers Bigel Sibley & Sajovec, PA

(57) ABSTRACT

Method and arrangement in a base station for scheduling radio resources to a user equipment. The method and arrangement comprises receiving a scheduling request from the user equipment, and also a time offset value which value is associated with the moment of time when a frame of data was generated in the user equipment buffer. Also, the moment of time when the frame of data was generated in the user equipment buffer is determined, based on the received time offset value. Thereby the buffer state of the user equipment buffer is predicted by using the determined moment of time when the frame of data was generated in the user equipment buffer. Further, radio resources are granted to the user equipment, based on the predicted buffer state of the user equipment buffer. In addition, a method and arrangement in a user equipment for assisting the base station in scheduling radio resources are described.

15 Claims, 7 Drawing Sheets

(56) References Cited

U.S. PATENT DOCUMENTS

| | | | |
|---|---|---|---|
| 2008/0095055 A1* | 4/2008 | Moulsley et al. | 370/234 |
| 2008/0205275 A1* | 8/2008 | Rinne et al. | 370/235 |
| 2008/0232260 A1* | 9/2008 | Yeo et al. | 370/242 |
| 2009/0175159 A1 | 7/2009 | Bertrand et al. | |
| 2009/0225739 A1* | 9/2009 | Yeo et al. | 370/345 |
| 2010/0150082 A1* | 6/2010 | Shin et al. | 370/329 |
| 2010/0254321 A1* | 10/2010 | Kim et al. | 370/329 |

OTHER PUBLICATIONS

Ericsson, "SR triggering in relation to uplink grants", 3GPP Draft: R2-081468, 3rd Generation Partnership Project, Mobile Competence Centre; 650, Route des Lucioles; F-06921 Sophia-Antipolis Cedex; France; RAN WG2, Shenzhen, China, 20080325, Mar. 31, 2008-Apr. 4, 2008, XP050139212.

Qin et al., "Optimised Optical Burst Aggregation by Employing Dynamic State-Space Feedback Gain Scheduling Controller", *IEEE 2009 International Conference on Optical Network Design and Modeling*, Braunschweig, Germany, Feb. 18, 2009-Feb. 20, 2009, pp. 1-6, XP031469126.

Zorba et al, "A Multiple User Opportunistic Scheme: The Grassmannian Approach", *IEEE 2006 International Zurich Seminar on Communications*, Zurich, Switzerland, Feb. 22, 2006-Feb. 24, 2006, pp. 134-137, XP010924256.

\* cited by examiner

SR = Scheduling Request
G = Grant
T = Transmit
R = Retransmit,
N = NACK
A = ACK

METHOD AND ARRANGEMENT IN A WIRELESS COMMUNICATION SYSTEM

CROSS REFERENCE TO RELATED APPLICATIONS

This application is a 35 U.S.C. §371 national stage application of PCT International Application No. PCT/SE2009/050982, filed on 31 Aug. 2009, the disclosure and content of which is incorporated by reference herein in its entirety. The above-referenced PCT International Application was published in the English language as International Publication No. WO 2011/025427 A1 on 3 Mar. 2011.

TECHNICAL FIELD

The present invention relates to a method and arrangement in a user equipment and a method and arrangement in a base station. More in particular, it relates to a mechanism for uplink scheduling within a wireless communication system.

BACKGROUND

In Long Term Evolution (LTE), the scheduler is placed in the eNodeB and the Medium Access Control (MAC) layer. The scheduler assigns radio resources, also called Resource Blocks (RB). The user equipments find out where to listen or where to send by listening for downlink (assignments) and uplink (grants) on the Physical Downlink Control Channel (PDCCH). Also, information concerning which transport format to use is comprised within the assignment and grant, respectively.

The radio downlink is the transmission path from a base station, e.g. an eNodeB to a terminal, or a User Equipment (UE) as the terminal also may be referred to as. The uplink is the inverse of a downlink, i.e. the transmission path from the terminal to the base station.

However, as the eNodeB schedules uplink transmissions while the buffers are located in the terminal, the terminal has to notify the eNodeB that it has data that it would like to transmit. The terminal supplies the eNodeB with information about the data in its buffers using two mechanisms; a 1-bit scheduling request (SR) or buffer status reports (BSR). Scheduling requests are transmitted on a control channel such as e.g. Physical Uplink Control Channel (PUCCH) or Random Access Channel (RACH). This process is illustrated in FIG. 1, which depicts prior art uplink scheduling. Buffer status reports are however transmitted on a data channel such as Physical Uplink Shared Channel (PUSCH) mostly together with user data.

If the terminal has a valid PUCCH resource for scheduling request configured in any transmission time interval (TTI) it sends a one bit scheduling request when the timing is right. Otherwise it initiates a random access procedure and cancels all pending scheduling requests.

The terminal is only allowed to use the PUCCH at predefined points in time determined by the Dedicated Scheduling Request (D-SR) interval. The delay between the actual generation time of a data packet such as e.g. a Voice over the Internet Protocol (VoIP) packet and the sending of the D-SR can thus become as large as the D-SR interval.

In the present context, the generation time is defined as the actual time when the data was put in the transmit buffer at the terminal and arrival time is defined as the time when the eNodeB receives the scheduling request.

When using service aware buffer estimation such as e.g. VoIP aware buffer estimation, the generation time is valuable.

In VoIP, the buffer estimation algorithm moves between two states, SID and TALK and a state change should preferably occur when the codec switches between the corresponding states. The TALK state is a proactive buffer estimation state which guesses when the next voice frame will arrive and which size it will have, while the SID state is a passive state that expects Scheduling Requests when data has arrived for a user.

As voice frames arrive every 20 ms to the terminal buffer using for instance Adaptive Multi Rate (AMR), the better the algorithm knows the generation time, the more exact it will predict the buffer size and the delay of the voice frame.

The larger the D-SR interval is, the larger the difference between the generation time of the VoIP packet and the arrival time noted by the eNodeB may be. This makes it harder to accurately predict the buffer state and schedule delay-sensitive services, increasing the need for explicit signalling and decreasing the efficiency of the uplink assignments.

The VoIP aware buffer estimator use the arrival of the D-SR, processing time is deducted, as the VoIP packet generation time, and this can be very different from the actual VoIP packet generation time. Furthermore, the eNodeB scheduler does not have correct packet delay information and may schedule the VoIP packet too late, especially in scenarios where the required VoIP delay is relatively short.

It is to be noted that the scheduling request is a scarce resource and thus the D-SR interval can be relatively long compared to the time between generation of voice packets at the terminal.

SUMMARY

It is the object to obviate at least some of the above disadvantages and provide an improved performance within a wireless communication system.

According to a first aspect, the object is achieved by a method in a user equipment for assisting a base station in scheduling radio resources. The base station and the user equipment are comprised within a wireless communication system. The user equipment comprises a buffer arranged to buffer frames comprising data. The user equipment is arranged to send a scheduling request to the base station, only at certain dedicated moments in time. Those certain dedicated moments in time are separated by a predetermined time interval. Also, the user equipment is arranged to send data primarily after firstly having sent a scheduling request and being scheduled resources by the base station. According to the present method, it is detected when a frame of data is generated in the buffer. As it has been detected that the data to send has been generated in the buffer, a scheduling request is sent to the base station, in order to get a grant for sending the data to the base station. The method also comprises computing a time offset value based on the time difference between the moment when the frame of data was generated in the buffer and the moment when the scheduling request was sent. Then, the computed time offset value is sent to the base station.

According to a second aspect, the object is also achieved by an arrangement in a user equipment for assisting a base station in scheduling radio resources. The base station and the user equipment are comprised within a wireless communication system. The user equipment comprises a buffer arranged to buffer frames comprising data. The user equipment is arranged to send a scheduling request to the base station only at certain dedicated moments in time. Those certain dedicated moments in time are separated by a predetermined time interval. Further, the user equipment is arranged to send data only after firstly having sent a scheduling request and being scheduled resources by the base station. The arrangement comprises a detecting unit. The detecting unit is adapted to detect when data is generated in the buffer. Also, the arrangement comprises a computing unit. The computing unit is adapted to compute a time offset value, based on the time difference between the moment when the frame of data was generated in the buffer and the moment when the scheduling request was sent. In addition, the arrangement comprises a sending unit. The sending unit is adapted to send a scheduling request to the base station. The sending unit further also adapted to send the computed time offset value to the base station.

According to a third aspect, the object is also achieved by a method in a base station for scheduling radio resources to a user equipment served by the base station. The base station and the user equipment are comprised within a wireless communication system. According to the present method, a scheduling request is received from the user equipment. Also, a time offset value is received from the user equipment. The received time offset value is associated with the moment of time when a frame of data was generated in the buffer of the user equipment. Based on the received time offset value, the moment of time when the frame of data was generated in the buffer of the user equipment is determined. Further, the buffer state of the user equipment buffer is predicted, by using the determined moment of time when the frame of data was generated in the buffer of the user equipment. Based on the predicted buffer state of the user equipment buffer, radio resources are granted to the user equipment.

According to a fourth aspect, the object is also achieved by an arrangement in a base station for scheduling radio resources to a user equipment served by the base station. The base station and the user equipment are comprised within a wireless communication system. The base station arrangement comprises a receiving unit. The receiving unit is adapted to receive a scheduling request from the user equipment. Also, the receiving unit is adapted to receive a time offset value from the user equipment. The received time offset value is associated with the moment of time when a frame of data was generated in the buffer of the user equipment. In further addition, the present base station arrangement comprises a determining unit. The determining unit is adapted to determine the moment of time when the frame of data was generated in the user equipment buffer, based on the received time offset value. The base station arrangement additionally comprises a predicting unit. The predicting unit is adapted to predict the buffer state of the user equipment buffer. The prediction is performed by using the determined moment of time when the frame of data was generated in the buffer of the user equipment. The base station arrangement additionally comprises a granting unit. The granting unit is adapted to grant radio resources to the user equipment, based on the predicted buffer state of the user equipment buffer.

By estimating the data generation time of data in the user equipment buffer, according to embodiments of the present methods and arrangements, it is possible to predict the user equipment buffer status. By using knowledge about the user equipments service related behaviour, it may be determined which state the user equipment is transmitting in and at what point in time the user equipment has data to send. This information is according to embodiments of the present methods and arrangements used for uplink scheduling, leading to higher capacity and coverage of the wireless communication system. Also better scheduling decisions may be made when delay is taken into account, which may be valuable in particular when scheduling delay sensitive traffic. Users will observe lower delays and resources on the physical downlink control channel PDCCH and the physical uplink shared channel PUSCH can be saved as uplink assignments will better match the current uplink buffer size.

The need for frequent explicit signalling related to buffer status, such as i.e., scheduling requests and buffer status reports, are also reduced. Thereby, as uplink radio resources are scheduled according to the predicted user equipment buffer status, less signalling has to be made between the base station to the user equipment. As the number of grants that are transmitted within the wireless communication system limits the number of user equipments that may use the system simultaneously, it is possible to increase the load within the system by letting more user equipments participate.

Further, the overall reduced signalling resulting from the present methods and arrangements render higher capacity and better coverage within the system. Thereby an improved performance in a communication system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a user equipment and as a method and an arrangement in a base station, which may be put into practice in the embodiments described below. This invention may, however, be embodied in many different forms and may not be construed as limited to the embodiments set forth herein; rather, these embodiments are provided so that this disclosure will be thorough and complete, and will fully convey the scope of the invention to those skilled in the art. It is to be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
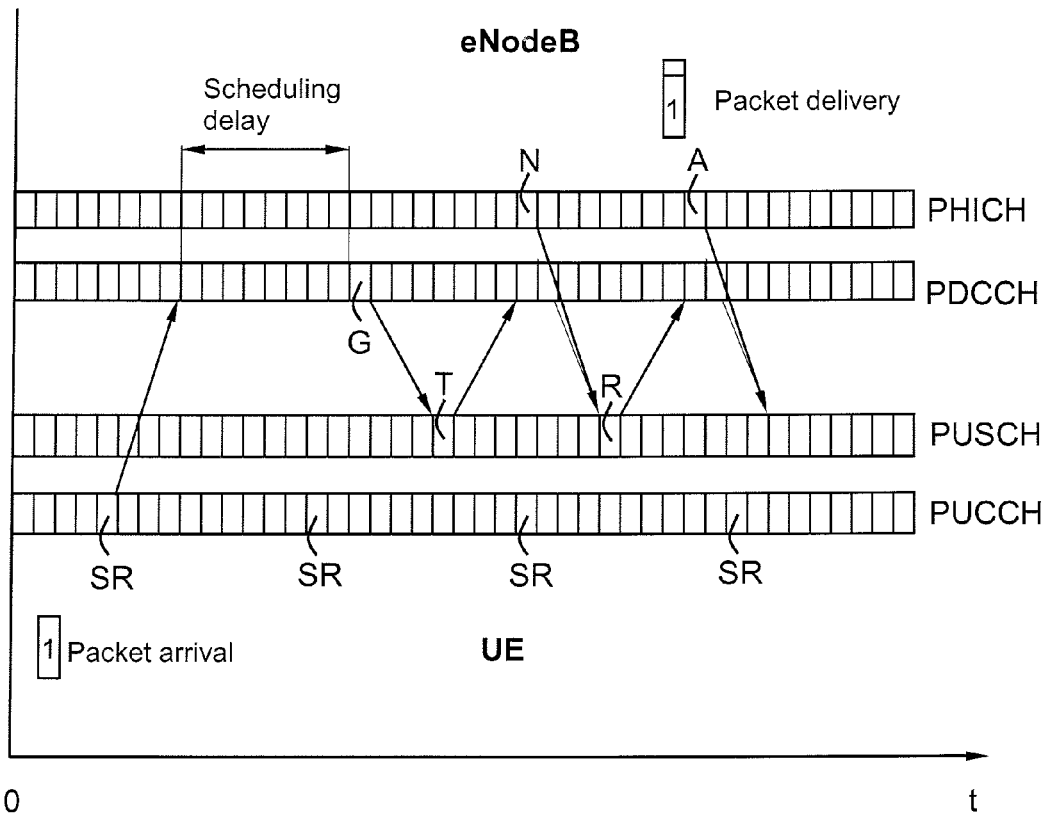
FIG. 1 is a flow chart illustrating scheduling communication according to prior art.
Figure 2:
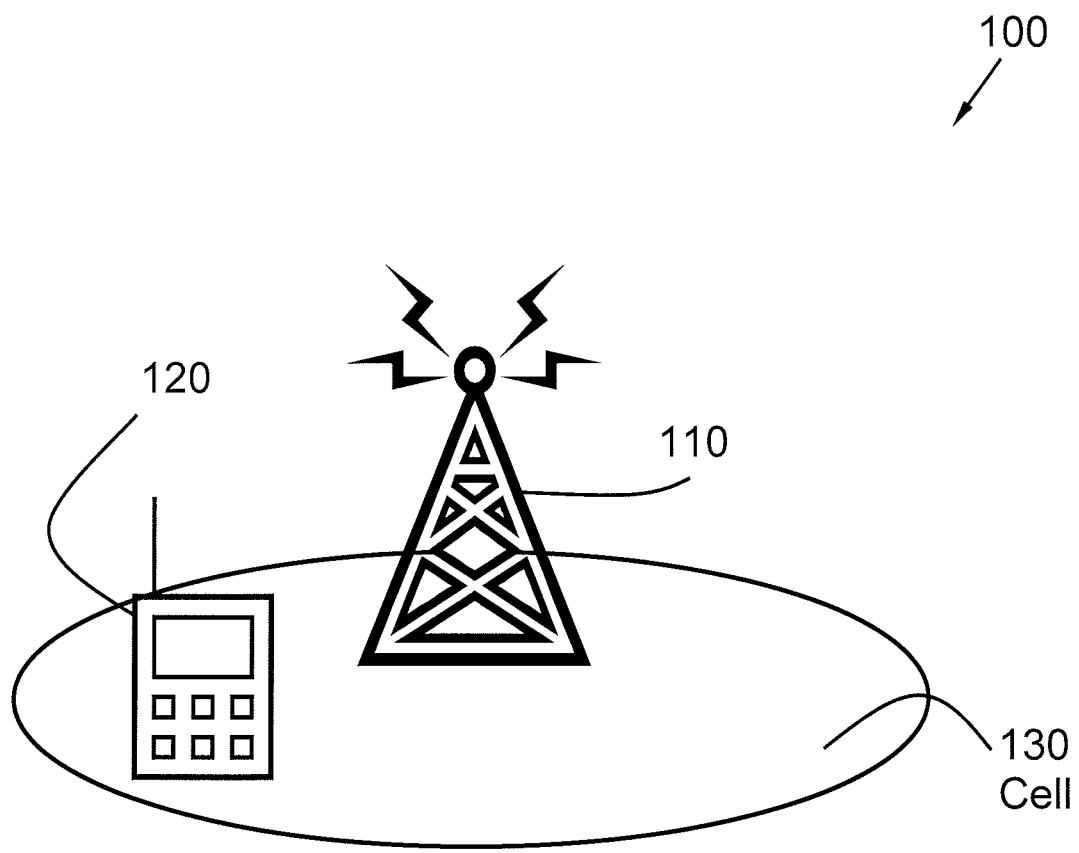
FIG. 2 is a schematic block diagram illustrating a wireless communication system.

FIG. 2 is a schematic illustration over a wireless communication system 100. The wireless communication system 100 comprises at least one base station 110 and is arranged to comprise at least one user equipment 120. The base station 110 may send and receive wireless signals to and from the user equipment 120 situated within the cell 130.

Although only one base station 110 is shown in FIG. 2, it is to be understood that another configuration of base station transceivers may be connected through, for example, other network nodes, to define the wireless communication system 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the user equipment 120 may be represented by and/or referred to as a wireless communication device, a wireless communication terminal, a mobile cellular telephone, a terminal, a Personal Communications Systems terminal, a Personal Digital Assistant (PDA), a laptop, computer or any other kind of device capable of managing radio resources.

The wireless communication system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

Further, as used herein, the wireless communication system 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

However, in the exemplary embodiments in the subsequent description, the wireless communication system 100 is based on LTE.

The user equipment 120 may further communicate with other terminals not shown in FIG. 2, via the base station 110 comprised within the wireless communication system 100.

According to the present methods and arrangements, the user equipment 120 informs the base station 110 of how long time data has waited in the user equipment buffer before the scheduling request could be sent.

When a user equipment 120 sends its first voice frame in a burst, according to the present methods and arrangements, it may include the time it had to wait before it could send the scheduling request, which may be a dedicated scheduling request or a random access scheduling request allowing for a better estimate of the generation time. This information is in the present context referred to as the time offset. It allows the base station 110 to calculate when the data was generated in the user equipment buffer.

The base station 110 is further adapted to schedule the uplink transmissions from the user equipment 120, to the base station 110. In order to grant a particular user equipment 120 access to a particular uplink resource, a grant is generated and sent from the base station 110 to that particular user equipment 120, based on the estimated data generation time and predicted buffer state of the user equipment buffer, as will be further explained more in detail in connection with the presentation of FIG. 3.

Figure 3:
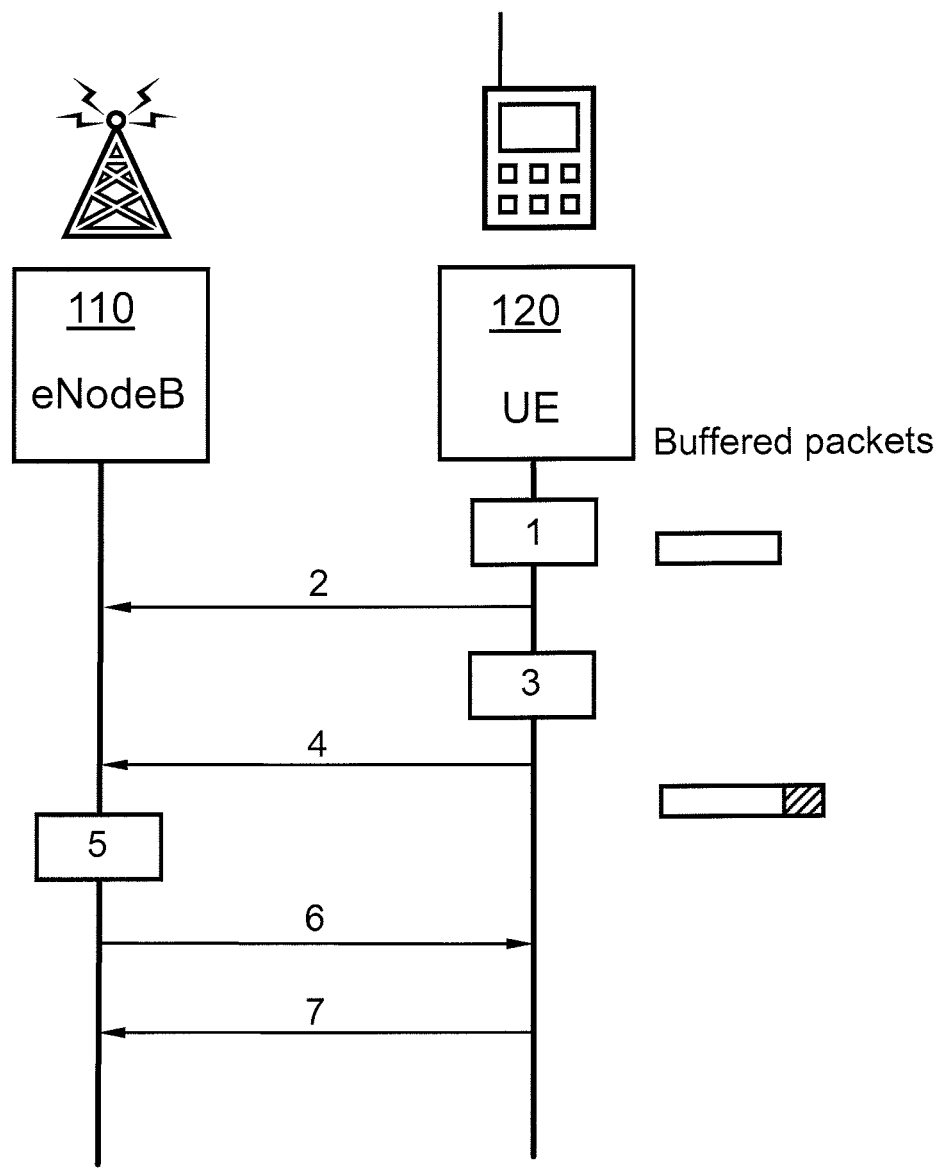
FIG. 3 is a combined flow chart and event diagram illustrating embodiments of method steps in a base station.

FIG. 3 illustrates transmissions and events involved when performing a mechanism for buffer status estimation, according to some embodiments.

When using VoIP in AMR mode, a voice frame is generated every 20 ms and a silence insertion descriptor (SID) frame every 160 ms. Thus the frames will arrive with regular spacing, therefore it is not necessary to run the present method and update the time offset and more than once in a while. One possible implementation may be to send the time offset with the first voice frame of a talk burst on the PUSCH and have a timer for suppressing this option for a short time after it was sent in case the call changes direction frequently during a period. The exemplary use of VoIP in AMR mode in the present context is made only for increasing the understanding of the present methods and arrangements. However, the present methods and arrangements may be used in various other contexts.

1

Data is generated and stored in the buffer of the user equipment 120. This is detected by a detection unit within the user equipment 120.

2

A scheduling request is sent to the base station 110, requesting resources for sending the data in the buffer of the user equipment 120 to the base station 110.

3

A time offset value is computed by the user equipment 120, based on the time difference between the moment when the frame of data was generated in the buffer and the moment when the scheduling request was sent.

Most delay sensitive services would require a rather short D-SR interval, therefore 5 bits for indicating the time offset may be sufficient, according to some embodiments.

According to some embodiments, the time offset value i.e. the time the data waited in the queue before the scheduling request was sent, can be piggybacked on the data similar to a buffer status report (BSR) when data is sent. It may however require a new MAC control element.

4

The computed time offset value is sent to the base station 110. As the time offset value is received at the base station 110, it is associated with the received scheduling request from the user equipment 120.

5

At the base station 110 the moment of time when the frame of data was generated in the buffer of the user equipment is determined based on the received time offset value. Based on the determined moment of time when the frame of data was generated in the buffer of the user equipment, the buffer state of the user equipment buffer may then be predicted. Also, the base station 110 can adjust the priority of the user equipment 120 based on the improved delay estimate.

6

Based on the predicted buffer state of the user equipment buffer, radio resources are granted to the user equipment 120 and a grant is sent to the user equipment 120.

7

Receiving the grant from the base station 110, the user equipment 120 may send data buffered in the buffer to the base station 110.

Figure 4:
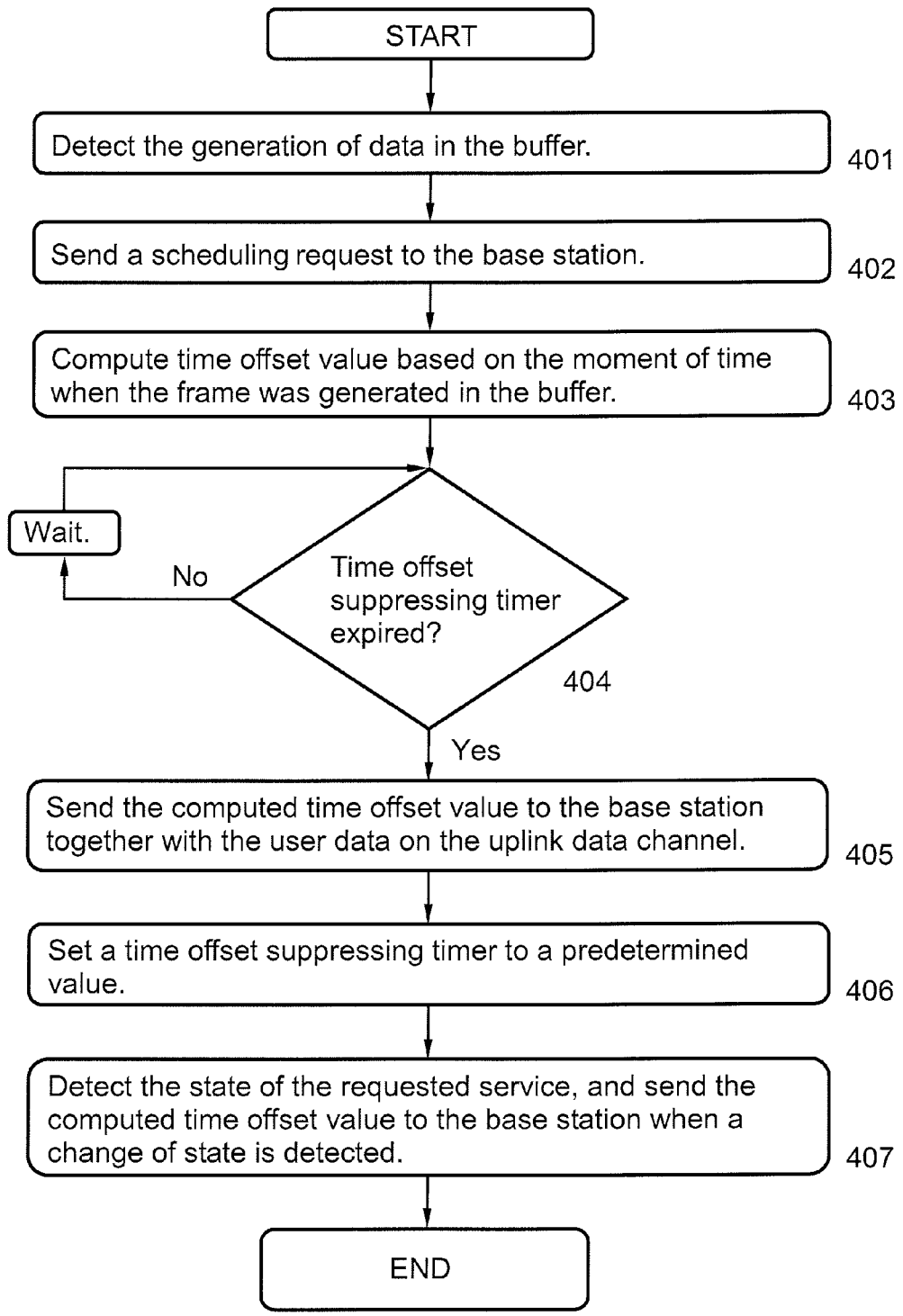
FIG. 4 is a flow chart illustrating embodiments of method steps in a user equipment.

FIG. 4 is a flow chart illustrating embodiments of method steps 401-407 performed in a user equipment 120. The method aims at assisting a base station 110 in scheduling radio resources. The base station 110 and the user equipment 120 are comprised within a wireless communication system 100. The user equipment 120 comprising a buffer arranged to buffer frames comprising data. The user equipment 120 is arranged to send a scheduling request to the base station 110 only at certain dedicated moments in time, which are separated by a predetermined time interval and to send data only after firstly having sent a scheduling request and being scheduled resources by the base station 110.

The requested service may according to some embodiments comprise different states. The different states may comprise e.g. a talk state and a silence state.

To appropriately assist a base station 110 in scheduling radio resources, the method may comprise a number of method steps 401-407.

It is however to be noted that some of the described method steps 401-407 are optional and only comprised within some embodiments. Further, it is to be noted that the method steps 401-407 may be performed in any arbitrary chronological order and that some of them, e.g. step 401 and step 403, or even all steps may be performed simultaneously or in an altered, arbitrarily rearranged, decomposed or even completely reversed chronological order. The method may comprise the following steps:

Step 401

It is detected when data is generated in the buffer. Thereby, when a frame of data is generated in the buffer, the data generation is detected.

Step 402

A scheduling request is sent to the base station 110. In the scheduling request, the user equipment 120 requests to send the generated frame of data in the buffer to the base station, for possibly further forwarding to the recipient of the generated data.

Step 403

A time offset value is computed, based on the time difference between the moment when the frame of data was generated in the buffer and the moment when the scheduling request was sent. This time offset value may vary from no time offset at all up to the size of the scheduling request interval.

Optionally, a new time offset value may be computed and sent to the base station 110 if the computed time offset value has changed when data arrive to the buffer, according to some embodiments.

According to some embodiments, the computed time offset value may be sent to the base station 110 together with the frame of data.

Step 404

This step is optional and may only be performed within some embodiments.

A time offset suppressing timer may be checked, whether the time offset suppressing timer has expired before performing the step of sending the time offset value. If the time offset suppressing timer has expired, the time offset value is sent to the base station 110.

If the time offset suppressing timer has not expired, no sending of the time offset value is performed.

Step 405

The computed time offset value is sent to the base station 110.

The computed time offset value may according to some embodiments be sent to the base station 110 when a change of state is detected.

Step 406

This step is optional and may only be performed within some embodiments.

A time offset suppressing timer may be set to a predetermined value after the step of sending the computed time offset value to the base station 110, according to some embodiments. Thereby a very frequent updating of time offset values may be suppressed.

Step 407

This step is optional and may only be performed within some embodiments.

The state of the requested service may be detected.

Figure 5:
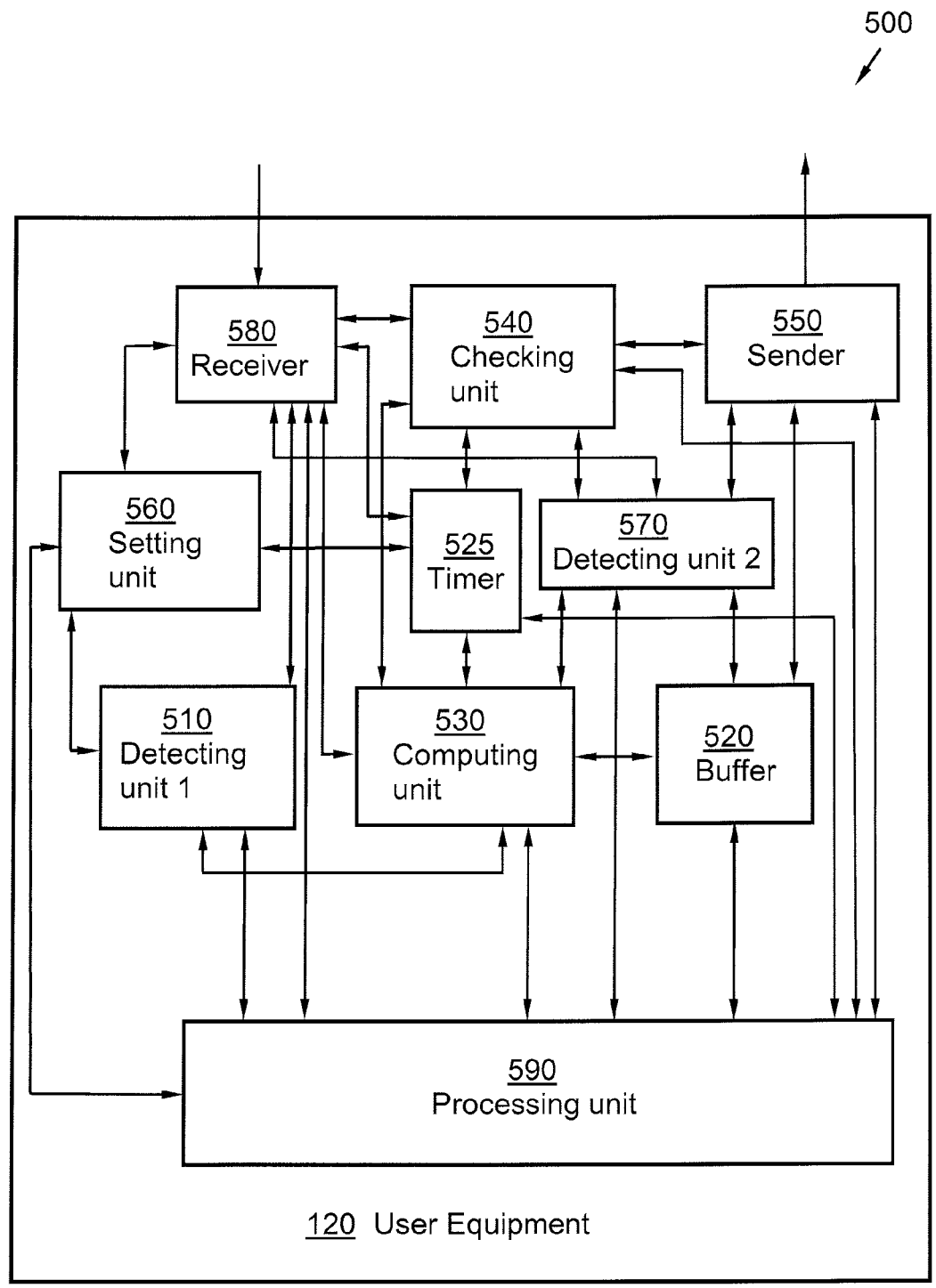
FIG. 5 is a block diagram illustrating embodiments of an arrangement in a user equipment.

FIG. 5 is a block diagram illustrating embodiments of an arrangement 500 situated in a user equipment 120 for assisting a base station 110 in scheduling radio resources. The arrangement 500 is configured to perform the method steps 401-407 for assisting a base station 110 in scheduling radio resources. The base station 110 and the user equipment 120 are comprised within a wireless communication system 100, the user equipment 120 comprising a buffer 520. The buffer 520 is arranged to buffer frames comprising data. The user equipment 120 is arranged to send a scheduling request to the base station 110 only at certain dedicated moments in time. The certain dedicated moments in time are separated by a predetermined time interval. Further, the user equipment 120 is arranged to send data only after firstly having sent a scheduling request and being scheduled resources by the base station 110.

For the sake of clarity, any internal electronics of the arrangement 500, not completely necessary for understanding the present method has been omitted from FIG. 5.

The arrangement 500 comprises a detecting unit 510. The detecting unit 510 is adapted to detect when data is generated in the buffer 520. Also, the arrangement 500 comprises a computing unit 530. The computing unit 530 is adapted to compute a time offset value based on the time difference between the moment when the frame of data was generated in the buffer 520 and the moment when the scheduling request was sent. In addition, the arrangement 500 comprises a sending unit 550. The sending unit 550 is adapted to send a scheduling request to the base station 110 and to send the computed time offset value to the base station 110.

The arrangement 500 may optionally further comprise a time offset suppressing timer 525. The optional timer 525 may be used to control the generation and sending of time offset values to the base station 110. The timer may function as a count down timer, counting down from a specified time interval. According to some embodiments, the timer 525 may be adapted to a predetermined value.

In further addition, the arrangement 500 may comprise a checking unit 540. The optional checking unit 540 may be adapted to check if the time offset suppressing timer 525 has expired.

Further yet, the arrangement 500 may comprise a second detecting unit 570. The second detecting unit 570 may be adapted to detect the state of the requested service.

Still further, the arrangement 500 optionally may comprise, according to some embodiments, a receiving unit 580. The receiving unit 580 may be adapted to receive radio signals.

The arrangement 500 may according to some embodiments further comprise a processing unit 590. The processing unit 590 may be represented by e.g. a Central Processing Unit (CPU), a processor, a microprocessor, or other processing logic that may interpret and execute instructions. The processing unit 590 may perform all data processing functions for inputting, outputting, and processing of data including data buffering and device control functions, such as call processing control, user interface control, or the like.

It is to be noted that the described units 510-590 comprised within the arrangement 500 may be regarded as separate logical entities, but not with necessity as separate physical entities. Any, some or all of the units 510-590 may be comprised or co-arranged within the same physical unit. However, in order to facilitate the understanding of the functionality of the arrangement 500, the comprised units 510-590 are illustrated as separate units in FIG. 5.

Thus the transmitting unit 550 and e.g. the receiving unit 580 may, according to some embodiments, be comprised within one physical unit, a transceiver, which may comprise a transmitter circuit and a receiver circuit, which respectively transmits outgoing radio frequency signals to base station 110 and receives incoming radio frequency signals from the base station 110 via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g., paging signals/messages for incoming calls, which may be used to establish and maintain a voice call communication with another party or to transmit and/or receive data, such as SMS, e-mail or MMS messages, etc.

Computer Program Product in the User Equipment 120

The method steps 401-407 in the user equipment 120 may be implemented through one or more processor units 590 in the user equipment 120, together with computer program code for performing the functions of the present method steps 401-407. Thus a computer program product, comprising instructions for performing the method steps 401-407 in the user equipment 120 may assist a base station 110 in scheduling radio resources.

The computer program product mentioned above may be provided for instance in the form of a data carrier carrying computer program code for performing the method steps according to the present solution when being loaded into the processor unit 590. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the user equipment 120 remotely, e.g. over an Internet or an intranet connection.

Further, a computer program product comprising instructions for performing at least some of the method steps 401-407 may be used for implementing the previously described method in the user equipment 120 for assisting a base station 110 in scheduling radio resources, when the computer program product is run on a processing unit 590 comprised within the user equipment 120.

Figure 6:
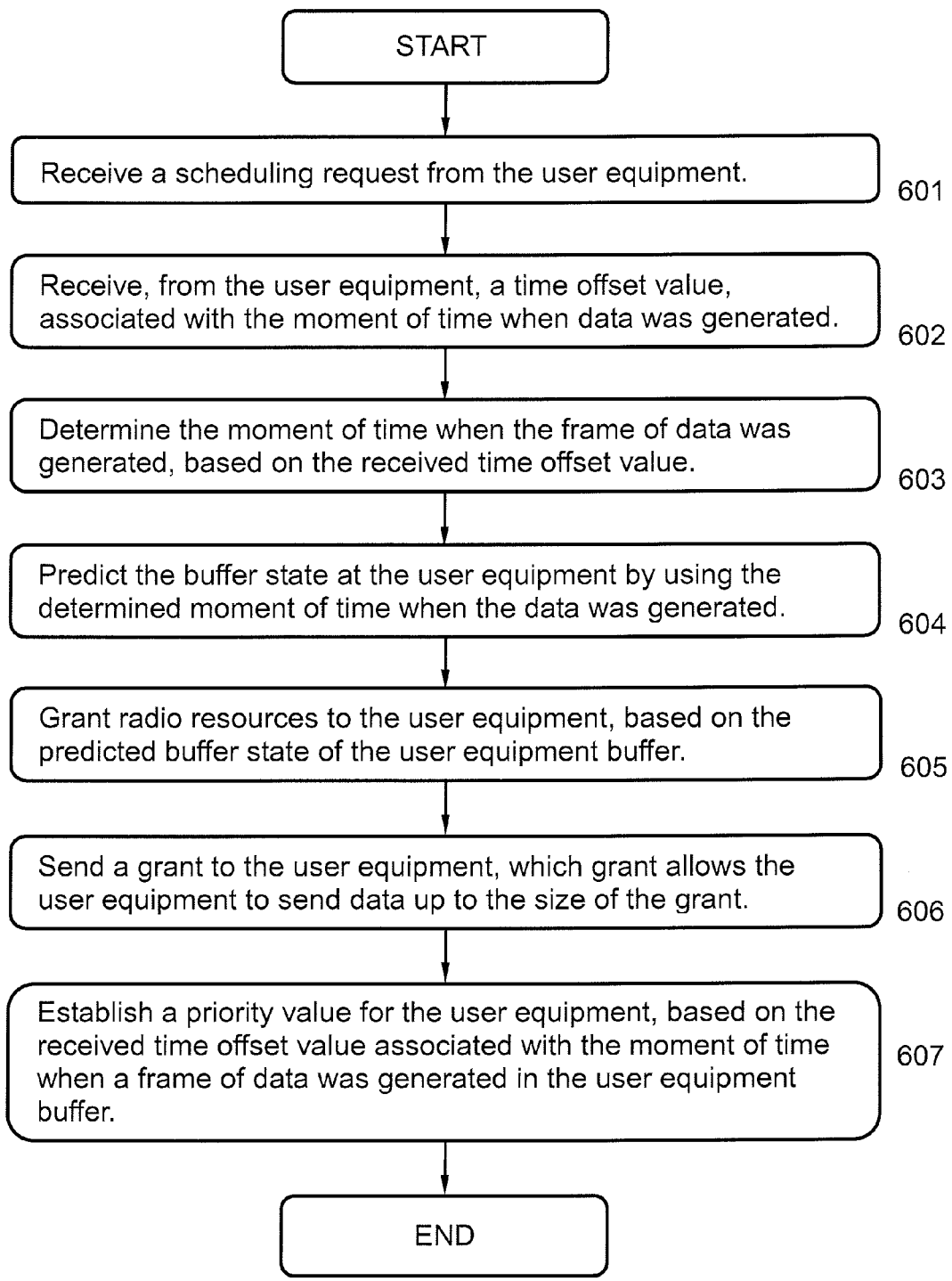
FIG. 6 is a flow chart illustrating embodiments of method steps in a base station.

FIG. 6 is a flow chart illustrating embodiments of method steps 601-607 performed in a base station 110. The method aims at scheduling radio resources to a user equipment 120, served by the base station 110. The base station 110 and the user equipment 120 are comprised within a wireless communication system 100.

The user equipment 120 is arranged to send a scheduling request to the base station 110 only at certain dedicated moments in time, which are separated by a predetermined time interval and to send data only after firstly having sent a scheduling request and being scheduled resources by the base station 110. The requested service may according to some embodiments comprise different states, such as e.g. a talk state and a silence state.

To appropriately schedule radio resources to the user equipment 120, the method may comprise a number of method steps 601-607.

It is however to be noted that some of the described method steps 601-607 are optional and only comprised within some embodiments. Further, it is to be noted that the method steps 601-607 may be performed in any arbitrary chronological order and that some of them, e.g. step 601 and step 602, or even all steps may be performed simultaneously or in an altered, arbitrarily rearranged, decomposed or even completely reversed chronological order. The method may comprise the following steps:

Step 601

A scheduling request is received from the user equipment 120.

Step 602

A time offset value is received from the user equipment 120 which value is associated with the moment of time when a frame of data was generated in the buffer 520 of the user equipment 120.

The time offset value may according to some embodiments be received from the user equipment 120 together with the frame of data.

Step 603

The moment of time when the frame of data was generated in the buffer 520 of the user equipment 120 is determined, based on the received time offset value.

Step 604

The buffer state of the user equipment buffer 520 is predicted by using the determined moment of time when the frame of data was generated in the buffer 520 of the user equipment 120.

Step 605

Radio resources are granted to the user equipment 120, based on the predicted buffer state of the user equipment buffer 520.

Step 606

This step is optional and may only be performed within some embodiments.

A grant may be sent to the user equipment 120, which grant allows the user equipment 120 to send data up to the size of the grant.

Step 607

This step is optional and may only be performed within some embodiments.

A priority value for the user equipment 120 may be established, based on the received time offset value associated with the moment of time when a frame of data was generated in the buffer 520 of the user equipment 120.

Figure 7:
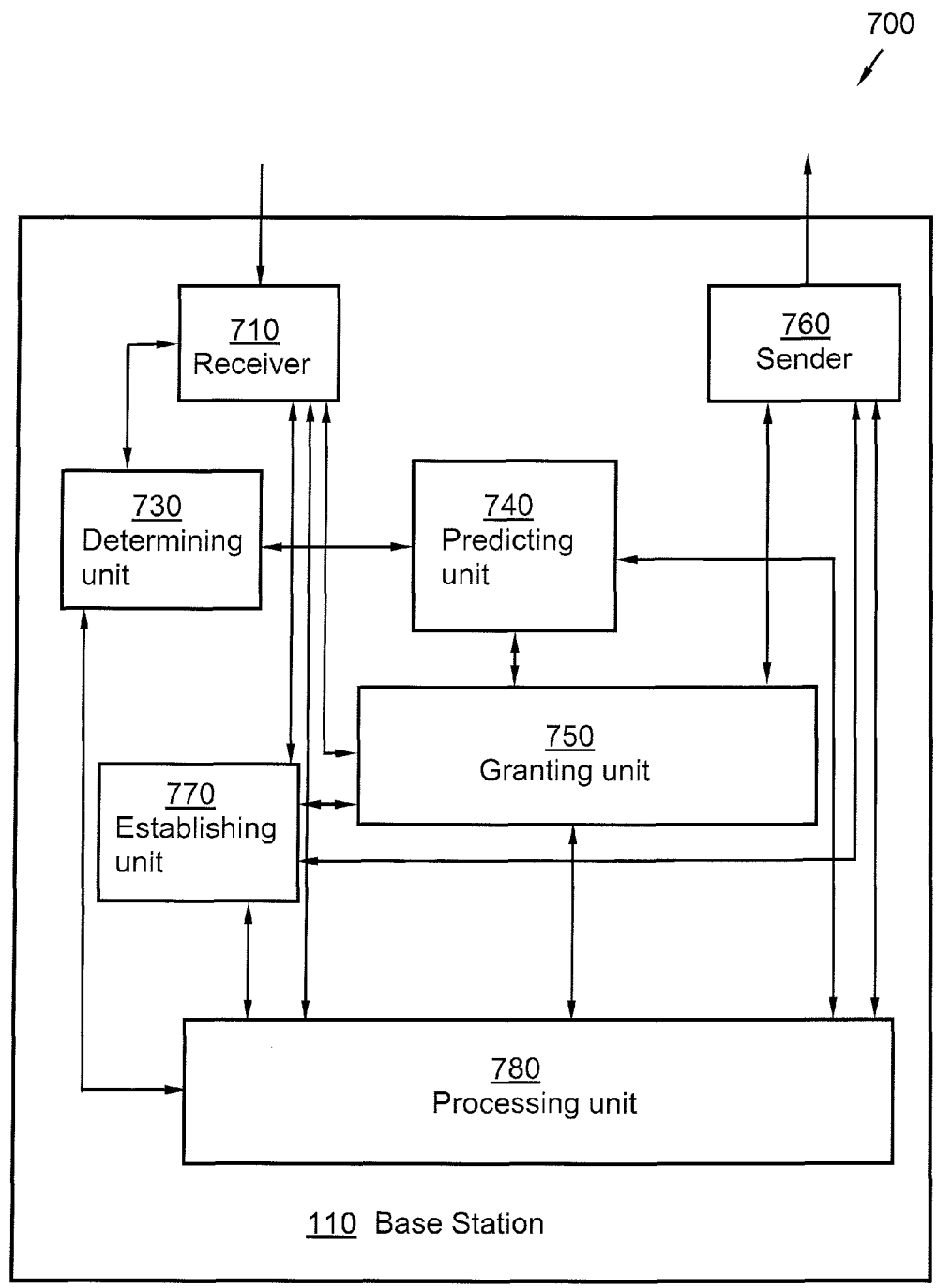
FIG. 7 is a block diagram illustrating embodiments of an arrangement in a base station.

FIG. 7 is a block diagram illustrating embodiments of an arrangement 700 situated in a base station 110. The arrangement 700 is configured to perform the method steps 601-607 for scheduling radio resources to a user equipment 120, served by the base station 110. The base station 110 and the user equipment 120 are comprised within a wireless communication system 100.

For the sake of clarity, any internal electronics of the arrangement 700, not completely necessary for understanding the present method has been omitted from FIG. 7.

The arrangement 700 comprises a receiving unit 710. The receiving unit 710 is adapted to receive a scheduling request and a time offset value which value is associated with the moment of time when a frame of data was generated in the buffer 520 of the user equipment 120. Also, the arrangement 700 comprises a determining unit 730. The determining unit 730 is adapted to determine the moment of time when the frame of data was generated in the buffer 520 of the user equipment 120, based on the received time offset value. In addition, the arrangement 700 comprises a predicting unit 740. The predicting unit 740 is adapted to predict the buffer state of the user equipment buffer 520 by using the determined moment of time when the frame of data was generated in the buffer 520 of the user equipment 120. Furthermore, additionally, the arrangement 700 comprises a granting unit 750. The granting unit 750 is adapted to grant radio resources to the user equipment 120, based on the predicted buffer state of the user equipment buffer 520.

The arrangement 700 may optionally further comprise a sending unit 760. The sending unit 760 is adapted to send a grant to the user equipment 120. The grant allows the user equipment 120 to send data up to the size of the grant.

Further yet, the arrangement 700 may comprise an establishing unit 770. The establishing unit 770 may be adapted to establish a priority value for the user equipment 120, based on the received time offset value associated with the moment of time when a frame of data was generated in the buffer 520 of the user equipment 120.

The arrangement 700 may according to some embodiments further comprise a processing unit 780. The processing unit 780 may be represented by e.g. a Central Processing Unit (CPU), a processor, a microprocessor, or other processing logic that may interpret and execute instructions. The processing unit 780 may perform all data processing functions for inputting, outputting, and processing of data including data buffering and device control functions, such as call processing control, user interface control, or the like.

It is to be noted that the described units 710-780 comprised within the arrangement 700 may be regarded as separate logical entities, but not with necessity as separate physical entities. Any, some or all of the units 710-780 may be comprised or co-arranged within the same physical unit. However, in order to facilitate the understanding of the functionality of the arrangement 700, the comprised units 710-780 are illustrated as separate units in FIG. 7.

Thus the transmitting unit 760 and e.g. the receiving unit 710 may, according to some embodiments, be comprised within one physical unit, a transceiver, which may comprise a transmitter circuit and a receiver circuit, which respectively transmits outgoing radio frequency signals to the user equipment 120 and receives incoming radio frequency signals from the user equipment 120 via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g., paging signals/messages for incoming calls, which may be used to establish and maintain a voice call communication with another party or to transmit and/or receive data, such as SMS, e-mail or MMS messages, etc.

Computer Program Product in the Base Station 110

The method steps 601-607 in the base station 110 may be implemented through one or more processor units 780 in the base station 110, together with computer program code for performing the functions of the present method steps 601-607. Thus a computer program product, comprising instructions for performing the method steps 601-607 in the base station 110 may schedule radio resources to a user equipment 120, served by the base station 110.

The computer program product mentioned above may be provided for instance in the form of a data carrier carrying computer program code for performing the method steps according to the present solution when being loaded into the processor unit 780. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the base station 110 remotely, e.g. over an Internet or an intranet connection.

Further, a computer program product comprising instructions for performing at least some of the method steps 601-607 may be used for implementing the previously described method in the base station 110 for scheduling radio resources to the user equipment 120, when the computer program product is run on the processing unit 780 comprised within the base station 110.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. Method in a user equipment for assisting a base station in scheduling radio resources, the base station and the user equipment are comprised within a wireless communication system, the user equipment comprising a buffer arranged to buffer frames comprising data, the user equipment is arranged to send a scheduling request to the base station at certain dedicated moments in time, which are separated by a predetermined time interval and to send data after having sent a scheduling request and being scheduled radio resources by the base station, the method comprising the steps of:
   detecting when a frame of data is stored in the buffer;
   sending a scheduling request to the base station;
   computing a time offset value based on a time difference between timing when the frame of data was stored in the buffer and timing when the scheduling request was sent;
   sending the computed time offset value to the base station; and
   receiving a radio resource grant that is responsive to a predicted buffer state of the buffer of the user equipment, wherein the predicted buffer state comprises either a talk state or a silence state for a voice service.

2. Method according to claim 1, comprising the further steps of:
   setting a time offset suppressing timer to a predetermined value after the step of sending the computed time offset value to the base station; and
   checking if the time offset suppressing timer has expired before performing the step of sending the time offset value.

3. Method according to claim 1, wherein the voice service comprises a requested service, and wherein the method further comprises:
   detecting a state of the requested service, and wherein the step of sending the computed time offset value to the base station is performed in response to detecting a change of the state of the requested service.

4. Method according to claim 1, wherein a new time offset value is computed and sent to the base station in response to determining that the computed time offset value has changed when a new frame of data is stored in the buffer.

5. Method according to claim 4, wherein the computed new time offset value is sent to the base station together with the new frame of data.

6. Arrangement in a user equipment for assisting a base station in scheduling radio resources, the base station and the user equipment are comprised within a wireless communication system, the user equipment comprising a buffer arranged to buffer frames comprising data, the user equipment is arranged to send a scheduling request to the base station at certain dedicated moments in time, which are separated by a predetermined time interval and to send data after having sent a scheduling request and being scheduled resources by the base station, the arrangement comprising:

- a detecting unit, adapted to detect when a frame of data is stored in the buffer;
- a computing unit, adapted to compute a time offset value based on a time difference between timing when the frame of data was stored in the buffer and timing when the scheduling request was sent;
- a sending unit, adapted to send a scheduling request to the base station and to send the computed time offset value to the base station; and
- a receiving unit that is adapted to receive a radio resource grant that is responsive to a predicted buffer state of the buffer of the user equipment, wherein the predicted buffer state comprises either a talk state or a silence state for a voice service.

7. Method in a base station for scheduling radio resources to a user equipment served by the base station, the base station and the user equipment are comprised within a wireless communication system, the method comprising the steps of:

receiving, by the base station, a scheduling request from the user equipment;

receiving, by the base station and from the user equipment, a time offset value that indicates timing when a frame of data was stored in a buffer of the user equipment, wherein the time offset value is based on a time difference between the timing when the frame of data was stored in the buffer and timing when the scheduling request was sent;

predicting, by the base station, a buffer state of the user equipment buffer in response to the time offset value; and granting, by the base station, radio resources to the user equipment, based on the predicted buffer state of the user equipment buffer, wherein the predicted buffer state comprises either a talk state or a silence state for a voice service.

8. Method according to claim 7, wherein the time offset value is received from the user equipment together with the frame of data.

9. Method according to claim 7, comprising the further step of:

sending a grant to the user equipment that constrains the user equipment to sending an amount of data that does not exceed the size of the grant.

10. Method according to claim 7, comprising the further step of:

establishing a priority value scheduling of radio resources for the user equipment based on the received time offset value.

11. Arrangement in a base station for scheduling radio resources to a user equipment served by the base station, the base station and the user equipment are comprised within a wireless communication system, the arrangement comprising:

- a receiving unit of the base station, adapted to receive, from the user equipment, a scheduling request and a time offset value that indicates timing when a frame of data was stored in a buffer of the user equipment, wherein the time offset value is based on a time difference between the timing when the frame of data was stored in the buffer and timing when the scheduling request was sent;
- a predicting unit of the base station, adapted to predict a buffer state of the user equipment buffer in response to the time offset value; and
- a granting unit of the base station, adapted to grant radio resources to the user equipment, based on the predicted buffer state of the user equipment buffer, wherein the predicted buffer state comprises either a talk state or a silence state for a voice service.

12. Method according to claim 11, comprising the further step of:

establishing a priority value for scheduling of radio resources for the user equipment based on the received time offset value.

13. Method according to claim 1, wherein the computed time offset value is sent to the base station together with the frame of data.

14. The method according to claim 7, wherein the predicting the buffer state of the user equipment buffer comprises:

determining the timing when the frame of data was stored in the buffer of the user equipment, using the time offset value; and predicting the buffer state of the user equipment buffer by using the determined timing when the frame of data was stored in the buffer of the user equipment.

15. The method according to claim 3, wherein:

the requested service comprises a Voice over Internet Protocol (VoIP) service; and sending the computed time offset value to the base station is performed in response to detecting a change of a state of the VoIP service between the silence state and the talk state.

* * * * *

UNITED STATES PATENT AND TRADEMARK OFFICE
CERTIFICATE OF CORRECTION

PATENT NO. : 8,854,999 B2  
APPLICATION NO. : 13/388420  
DATED : October 7, 2014  
INVENTOR(S) : Landstrom et al.

Page 1 of 1

It is certified that error appears in the above-identified patent and that said Letters Patent is hereby corrected as shown below:

In the Claims

In Column 12, Line 25, in Claim 1, delete "Method" and insert -- A method --, therefor.

In Column 12, Line 46, in Claim 2, delete "Method" and insert -- The method --, therefor.

In Column 12, Line 54, in Claim 3, delete "Method" and insert -- The method --, therefor.

In Column 12, Line 61, in Claim 4, delete "Method" and insert -- The method --, therefor.

In Column 12, Line 65, in Claim 5, delete "Method" and insert -- The method --, therefor.

In Column 13, Line 1, in Claim 6, delete "Arrangement" and insert -- An arrangement --, therefor.

In Column 13, Line 27, in Claim 7, delete "Method" and insert -- The method --, therefor.

In Column 13, Line 50, in Claim 8, delete "Method" and insert -- The method --, therefor.

In Column 14, Line 1, in Claim 9, delete "Method" and insert -- The method --, therefor.

In Column 14, Line 6, in Claim 10, delete "Method" and insert -- The method --, therefor.

In Column 14, Line 11, in Claim 11, delete "Arrangement" and insert -- An arrangement --, therefor.

In Column 14, Line 29, in Claim 12, delete "Method" and insert -- An arrangement --, therefor.

In Column 14, Line 34, in Claim 13, delete "Method" and insert -- The method --, therefor.

Signed and Sealed this  
Fourteenth Day of April, 2015

Michelle K. Lee  
*Director of the United States Patent and Trademark Office*